Oct. 3, 1967    P. T. DAY, JR    3,344,571
BUILDING CONSTRUCTION SYSTEM AND COMPONENTS THEREFOR
Filed Dec. 28, 1964    7 Sheets-Sheet 1

INVENTOR
*Paul T. Day, Jr.*

BY
ATTORNEY

INVENTOR
Paul T. Day, Jr.

Oct. 3, 1967 P. T. DAY, JR 3,344,571
BUILDING CONSTRUCTION SYSTEM AND COMPONENTS THEREFOR
Filed Dec. 28, 1964 7 Sheets-Sheet 7

INVENTOR
Paul T. Day, Jr.
BY *Gardner J. O'Bayle*
ATTORNEY

United States Patent Office 3,344,571
Patented Oct. 3, 1967

3,344,571
BUILDING CONSTRUCTION SYSTEM AND
COMPONENTS THEREFOR
Paul T. Day, Jr., Baltimore, Md., assignor to Inland
Steel Products Company
Filed Dec. 28, 1964, Ser. 421,250
15 Claims. (Cl. 52—376)

ABSTRACT OF THE DISCLOSURE

A structural framework for a building construction system formed of a number of truss members pivotally interconnected by truss bridging members, or optionally, metal lath to enable the truss members to pivot to a co-planar position so the framework can be collapsed into a compact shipping package.

---

This invention relates to an improved building construction system and components therefor, and more particularly to method of manufacture and fabrication of components, for use in building construction, embodying a series of trusses combined into a panel, which becomes a section of a wall, floor, ceiling, roof, beam or column of a complete building.

In my copending application Ser. No. 367,849, filed May 15, 1964, now abandoned, there is disclosed an improved building construction system wherein a series of trusses are combined into a panel, or a section of a wall or floor, the trusses being vertically and horizontally interconnected, and having upper and lower chord members comprising a plurality of ribs to which diagonal web members and connector elements are secured, as by welding. The panel or section of a wall, floor, roof or other element thus formed, may be utilized to fabricate high strength, lightweight building components for use in the construction of a core or framework to which facings or decks of various materials are applied, including lightweight cementitious material or plastics bonded to the cores to provide a unitary sandwich panel of selected span and width, or the cores may be completely embedded within a mass of suitable material.

In accordance with the system of the aforementioned application, it is contemplated that the several components which are to be connected or integrated into a structural framework may be prefabricated at a factory, rather than at a job site. While this method of handling the components is satisfactory when the job site is relatively near the fabrication plant, it has been found that when the job site is located in a remote area, and at a considerable distance from the fabrication plant, it is not economically feasible to ship the components in the fully erected, ready-for-installation condition, because of the shipping costs involved.

It will be appreciated that shipping charges are customarily based upon the distance between the shipping and delivery points, type of transportaion employed, weight of the cargo, and the space required to accommodate the same. With respect to these factors, in relation to the components of the present invention, it appeared from a preliminary study, that if a substantial reduction in required cargo space could be effected without concomitant increase in unit costs, such reduction would be reflected in worthwhile savings in the cost of shipping the components.

After considerable research and experimentation, I have found that cargo space requirements can be appreciably reduced by redesigning the components of my copending application Ser. No. 367,849, whereby said components (1) may be collapsed into compact shipping units, or (2) the elements or parts of the components may be shipping in an unassembled or "knock-down" form to the job site where the elements or parts may be quickly and economically fabricated by means of tie wires or ring clip connecting methods, as will be described more fully hereinafter.

By shipping the elements or parts of the components in "knock-down" condition and assembling the parts at the job site by means of tie wires, ring clips or the like, in lieu of welding, savings are not only effected in cargo space but also in labor costs, since highly skilled welders are not required. Accordingly, fabrication of the component parts into panels may be readily accomplished by relatively unskilled local labor in the vicinity of the job site, whether domestic or foreign location, with resultant stimulus to the local economy.

An object of my invention is to provide an improved building construction system.

Another object of my invention is to provide improved components for use in a building construction system.

Still another object of my invention is to provide an improved method of manufacture and fabrication of components for use in building construction.

Yet another object of my invention is to provide prefabricated components for use in building construction embodying a series of trusses combined into a panel which becomes a wall, floor, roof, beam or column.

A further object of my invention is to provide improved, prefabrication components for use in building construction embodying a series of trusses combined into a panel adapted to be collapsed into a compact shipping package.

A still further object of my invention is to provide improved, prefabricated components for use in a building construction system, constructed and arranged to be collapsed into compact shipping units, whereby a substantial reduction in cargo space is effected without concomitant increase in unit costs.

Yet a still further object of my invention is to provide improved components for use in a building construction system wherein the elements of the components may be shipped in "knock-down" condition to conserve shipping space, and assembled at the job site by means of tie wires, clips or the like.

With these and other objects in view, which may be incident to my improvements, the invention consists in the parts and combinations to be hereinafter set forth and claimed, with the understanding that the several necessary elements, comprising my invention, may be varied in construction, proportions and arrangement, without departing from the spirit and scope of the appended claims.

In order to make my invention more clearly understood, I have shown in the accompanying drawings means for carrying the same into practical effect, without limiting the improvements in their useful applications to the particular constructions which, for the purpose of explanation, have been made the subject of illustration.

In the drawings:

FIGURE 5A is a detail view of a modified hinge arrangement;

FIGURE 6 is an enlarged detail view showing one of the diagonals of the panel construction of FIGURE 4 in collapsed position, as illustrated in dotted lines;

FIGURE 1 is a view along line 7—7 of FIGURE 6;

Figure 1:
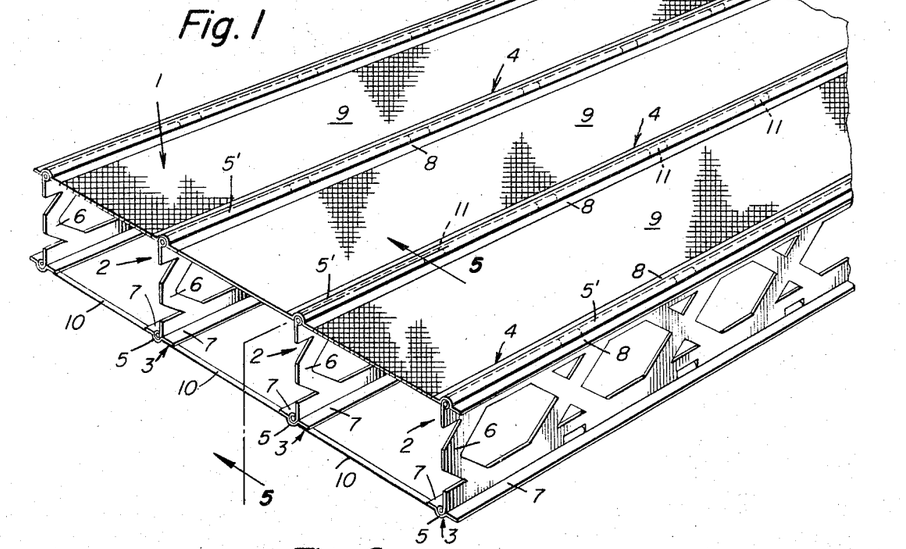
FIGURE 1 is a fragmentary perspective view of a portion of a collapsible panel of the present invention.

Referring to the drawings, and more particularly to FIGURE 1, there is shown an enlarged, fragmentary perspective view of a floor or roof panel 1, comprising a plurality of vertically and horizontally interconnected trusses 2, having lower chord members 3 and upper chord members 4, each of said chord members comprising metal ribs 5 and 5', respectively, to which a punched sheet metal channel section 6 is hinged, as will be described more fully hereinafter. The rib members may be of the same general type as the rib portions of conventional metal lath, said ribs being semi-circular in cross-section and having arms or wings 7 and 8 to which a suitable skin of metal lath 9 and truss bridging members 10, respectively are secured.

In connection with the panel arrangement shown in FIGURE 1, it will be appreciated that the bottom of the panel may also be formed with a surface skin of metal lath or the like, for the application of masonry, plaster, or other suitable surfacing materials. In the event that a nailable material, such as plaster board, plywood, composition siding, wall board, or flooring, is to be applied to the framework or core, in lieu of a lightweight cementitious material or plastic bonded to the core, suitable wood headers are incorporated in the basic framework, as will be described more fully hereinafter.

Figure 5:
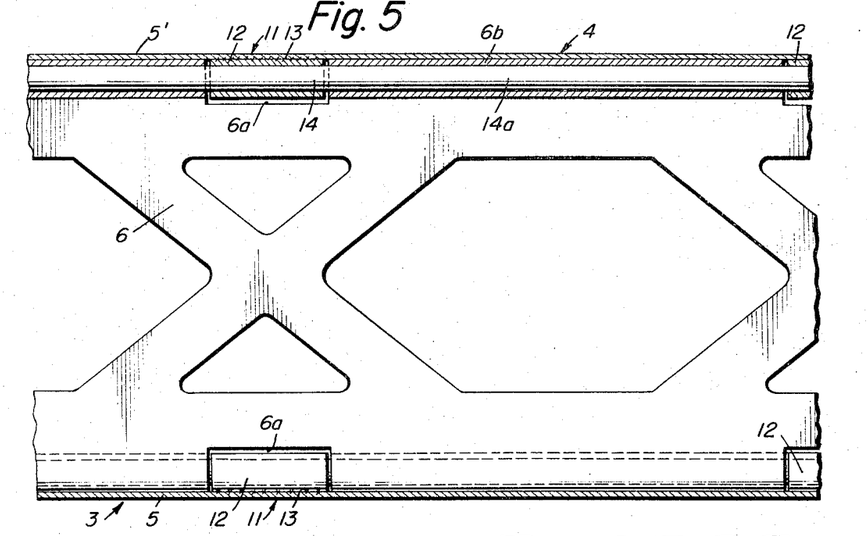
FIGURE 5 is a sectional view on line 5—5 of FIGURE 1.

In order that the panels and associated trusses may be collapsed into a compact shipping package, each channel section 6 is hingedly connected to the upper and lower chords by means of a plurality of longitudinally spaced hinge members 11, details of which are illustrated in FIGURE 5. Each hinge member comprises a tube or sleeve 12, having a portion of the exterior wall thereof welded as at 13 to the inner wall of one of the ribs 5 or 5', the channel section 6 being provided with a cut-out portion 6a to accommodate the opposite or "free" surface of the tube. A shaft 14 extends longitudinally through adjacent tubes and is journalled therein, the portion 14a of the shaft, which extends between adjacent tubes, being rigidly connected to the channel section 6 by means of eyelets 15 (FIGURE 3) formed by bending the end portions 6b of the channel section around the shaft.

Figure 2:
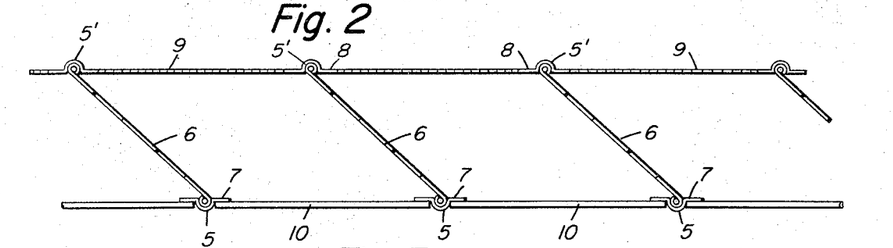
FIGURE 2 is an elevational view of the panel portion of FIGURE 1, showing the panel in partially collapsed position.
Figure 3:
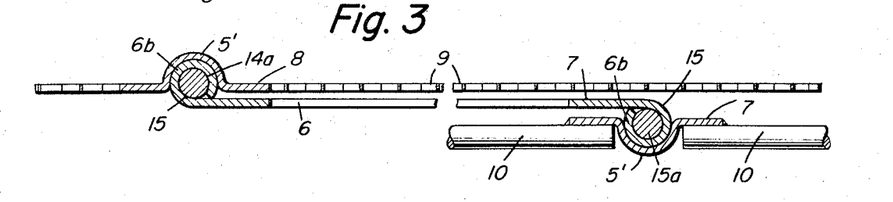
FIGURE 3 is an enlarged view showing one truss of the panel of FIGURE 2 in collapsed position.

By means of construction and arrangement of the channel sections 6, wherein these sections are hingedly connected to the lower and upper chords 3 and 4, respectively, as described hereinabove, it will be readily apparent that the upper surface skin of the panel shown in FIGURE 1 can be moved in the direction of the truss bridging members 11, or vice versa (FIGURE 2) to a collapsed position as illustrated in FIGURE 3. When erecting the assembly, the operation is reversed; that is, the metal lath 9, comprising the upper skin of the panel, and truss bridging members 11, are moved relatively to each other to bring the channel sections 6 into position at right angles thereto, as shown in FIGURE 1.

Figures 5A, 6, 7:
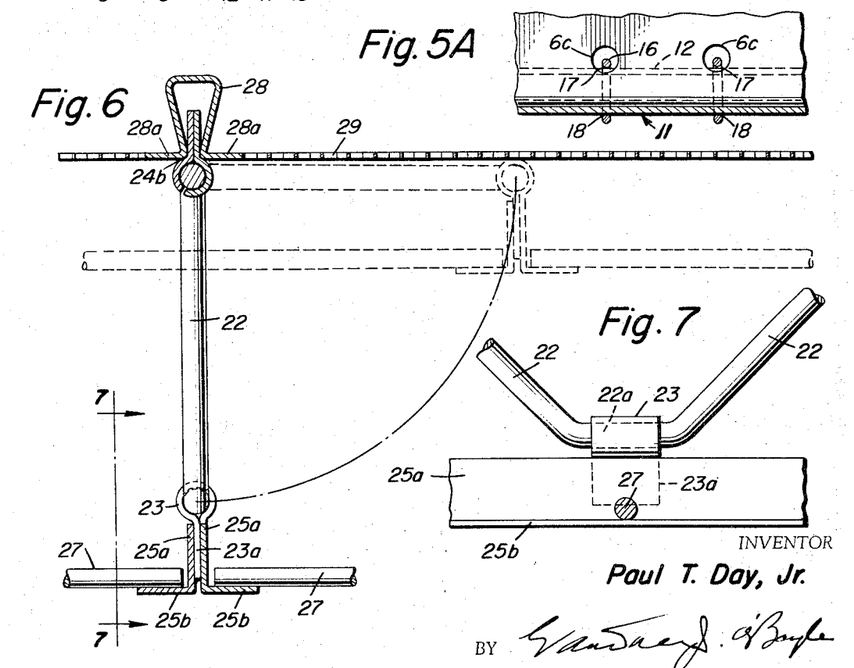

In FIGURE 5a, there is shown a modified method of securing the tubes or sleeves 12 to the ribs 5 and 5' in lieu of welding, as described in connection with FIGURE 5. In this embodiment, a plurality of spaced apertures 6c are formed in the channel section, each aperture being adapted to receive a tie wire or ring clip 16 which engages the peripheral wall of the tube 12 as at 17, and the rib portion of the chord as at 18. Thus, by tightening the tie wires or ring clips, the tube 12 is held rigidly against the inner wall of the rib, the shaft 14 being journaled within the tube as described above in connection with the assembly illustrated in FIGURES 1, 3 and 5.

With reference to the use of tie wires or ring clips for securing the tubes or sleeves, in lieu of welding, the wires or clips may be conventionally applied by means of a conventional power tool in the form of an air gun or the like, adapted to automatically feed a portion of suitable wire and "staple" the same about the elements to be secured. The "stapling" operation can be accomplished in the field, and it has been found that when cementitious surfacing material is applied to the wire mesh or the metal lath comprising the top and bottom skins of the panels, the wires or clips become embedded therein, and accordingly, welding is not required.

Figure 4:
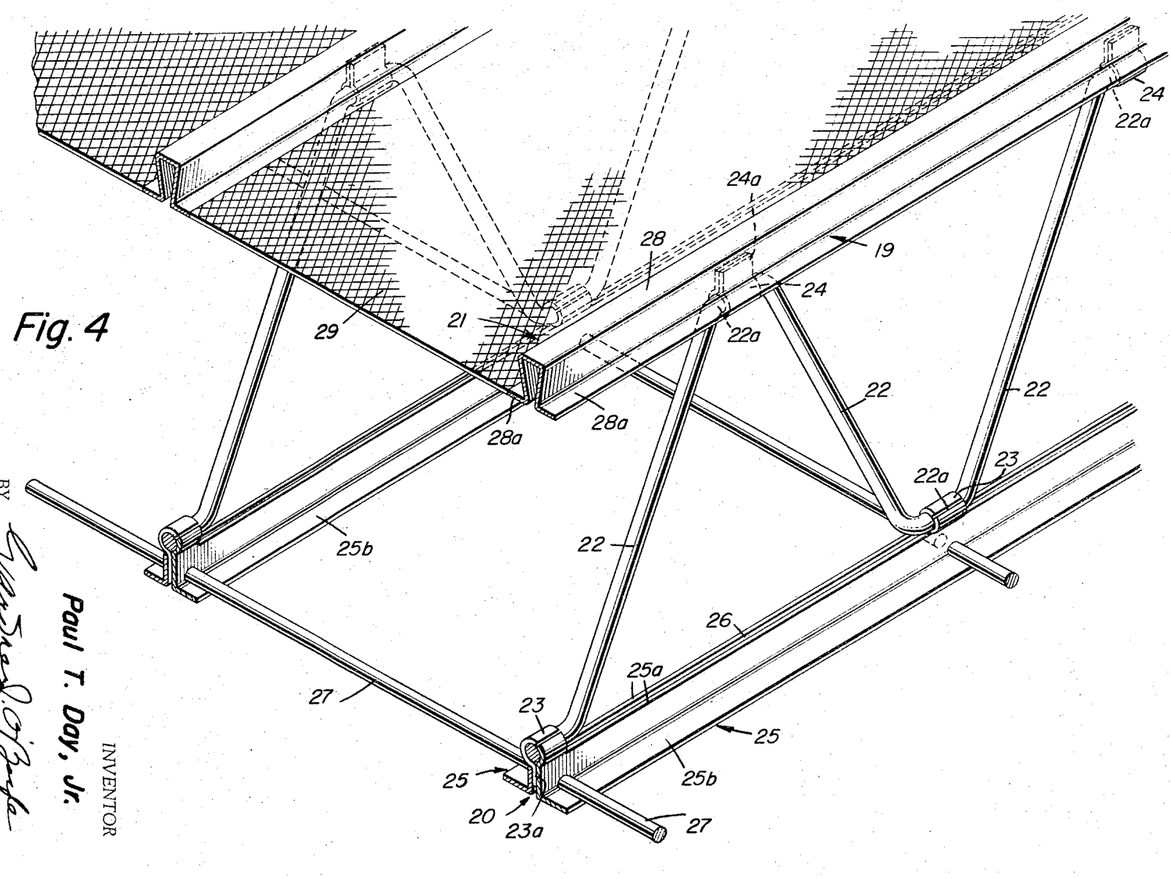
FIGURE 4 is a perspective view of a portion of a modified panel construction.

Reference being had to FIGURES 4, 6 and 7, there is shown a modification of the collapsible panel assembly of the present invention, wherein the panel comprises a plurality of trusses 19 having lower chords 20, upper chords 21, and a plurality of diagonals 22 formed from a continuous run of a metal rod, the diagonals terminating in relatively short parallel portions 22a adapted to be journaled in eyelets 23 and 24 secured to the lower and upper chords, respectively. Each of the lower chords comprises a pair of oppositely disposed longitudinally extending angle irons 25, the legs 25a of the respective angle irons being spaced to form a slot 26 for receiving a wing 23a formed on the eyelet. The eyelet wings are rigidly secured to the legs 25a by welding, and if desired, additional spot welds may be provided between the angle irons to maintain the legs 25a in spaced relationship. The lower chords also support truss bridging members 27 having their end portions rigidly secured, as by welding, to the legs 25b of the angle irons. Each of the upper chords comprises, a longitudinally extending rib portion 28, which is dovetail in cross-section, and provided with outwardly projecting arms or wings 28a to which suitable metal lath 29 is secured. Each of the eyelets 24 is formed with wings 24a which are inserted within the rib portion 28, and rigidly secured, as by welding, to the rib walls defining the throat portion 28b of the opening in the rib. By means of the pivotal connections between the diagonals 22 and the lower and upper chords 20 and 21, respectively, the panel assembly may be readily moved to collapsed position as shown in dotted lines in FIGURE 6.

Figure 8:
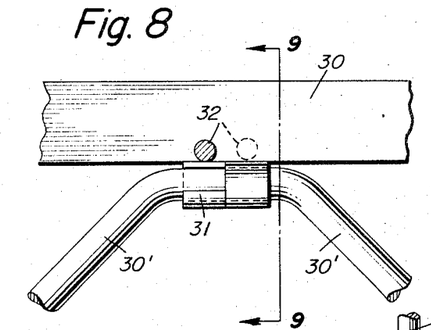
FIGURE 8 is a detail view of a pivoted mounting for the diagonals of a panel construction incorporating nailing strips.
Figure 9:
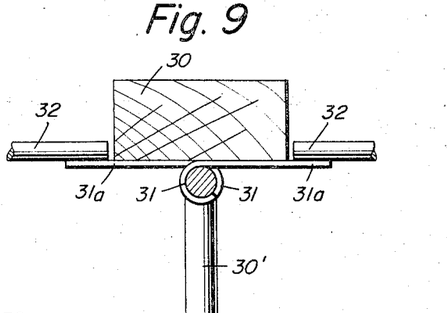
FIGURE 9 is a sectional view on line 9—9 of FIGURE 8.
Figures 10, 11:
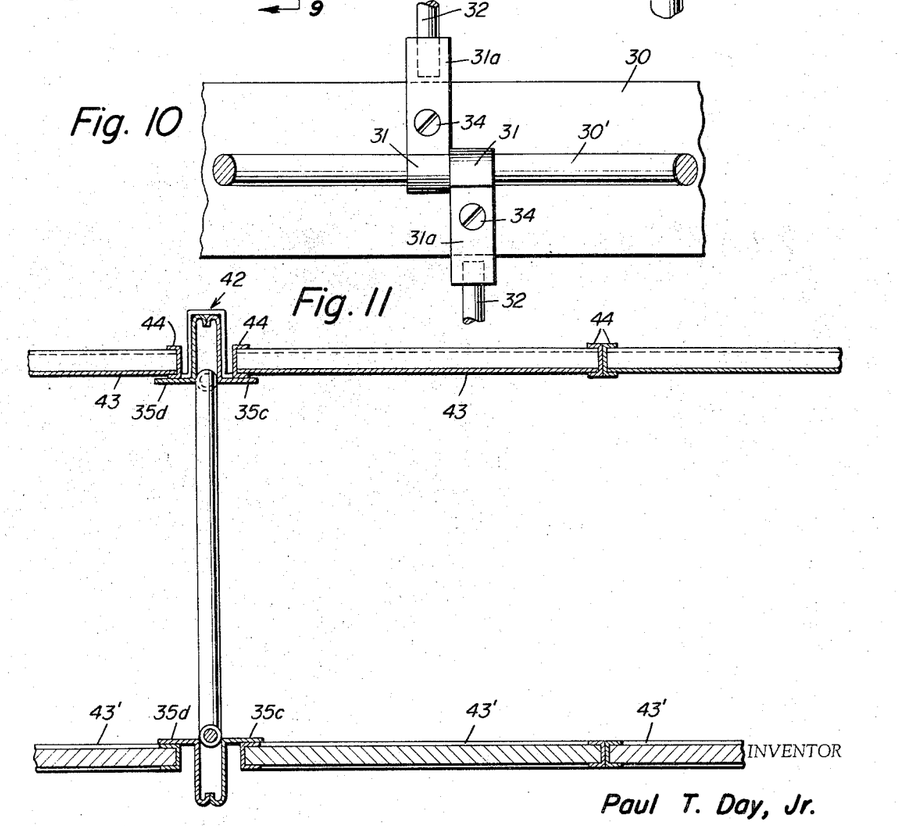
FIGURE 10 is a bottom plan view of FIGURE 8.
FIGURE 11 is a vertical sectional view of a panel construction for relatively long spans.

Referring to FIGURES 8, 9 and 10, there is shown a modified chord arrangement, wherein the truss chord 30 is in the form of a wood heading with rod or wire diagonals 30' to create the truss section. The diagonals are journaled within oppositely disposed eyelets 31 having outwardly extending arms 31a to which truss bridging rods 32 are secured. The wood heading member 30 is also secured to the arms by means of screws 34 or other suitable fastening means, to thereby provide a nailable surface in the event that plaster board, plywood composition siding, wall board, or flooring is to be applied to the trusses.

Reference being had to FIGURES 11–14, there is shown a further modification of the hinged connection between the chords and diagonals, wherein a pair of oppositely disposed, longitudinally extending, angle irons 35 (FIGURE 14) are pivotally mounted on a pin 36 by means of a pair of sleeves 37 and 38 welded to a respective angle iron as at 39 and 40. In this embodiment, the diagonals 41 are of tubular construction so that the ends 36a of the pin are inserted and rigidly held within the straight end portions 41a of the diagonals.

The legs 35a of the angle irons are provided with outwardly turned upper edge portions 35b which are adapted to abut each other to thereby limit the pivotal movement of the angle irons when the assembly is being erected. A tension clip 42 is provided for maintaining the angle irons in erected position and comprises a pair of leg portions 42a interconnected by a bight portion 42b, the leg portions being adapted to straddle the angle iron leg portions 35a when mounted thereon, the leg portions 35c and 35d of the angle irons being adapted to support suitable panel members. As shown in FIGURE 11, the upper or deck panel 43, formed from corrugated metal, is secured to the leg 35c comprising a portion of the upper chord, and a similar panel 43 is secured to the other leg 35d comprising the remaining portion of the chord. It will be observed that the corrugated metal panels 43 are capped by means of channel members 44 whereby to prevent leakage of cementitious or other surfacing material which may be applied to the panels. The bottom grid system (FIGURE 11) may be varied to suit any job requirement, that is to say, the bottom panel members may be hinged or otherwise supported. As shown, the bottom system may comprise a plurality of ceiling panels 43' formed from Celotex or the like.

Figure 12:
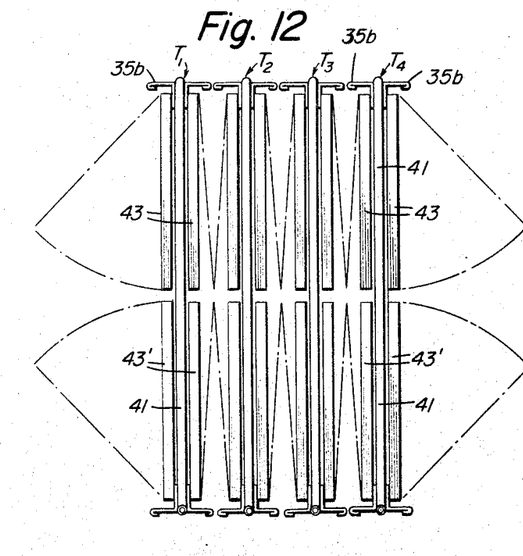
FIGURE 12 is a view of a series of collapsed panels illustrating their foldability into a compact shipping package.
Figures 12A, 13:
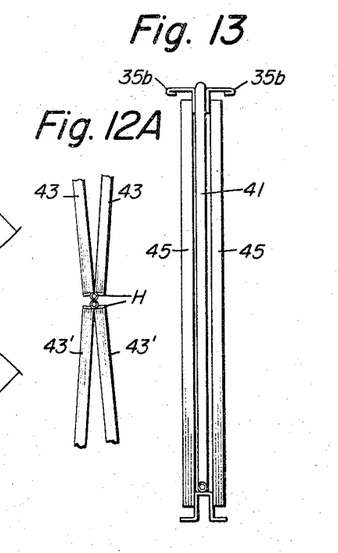
FIGURE 12a is a fragmentary view of the panels of FIGURE 12 showing the ends thereof interconnected by hinge means.
FIGURE 13 is a modification of the panel arrangement of FIGURE 12 showing a collapsed floor or ceiling panel adapted for relatively long spans.
Figure 14:
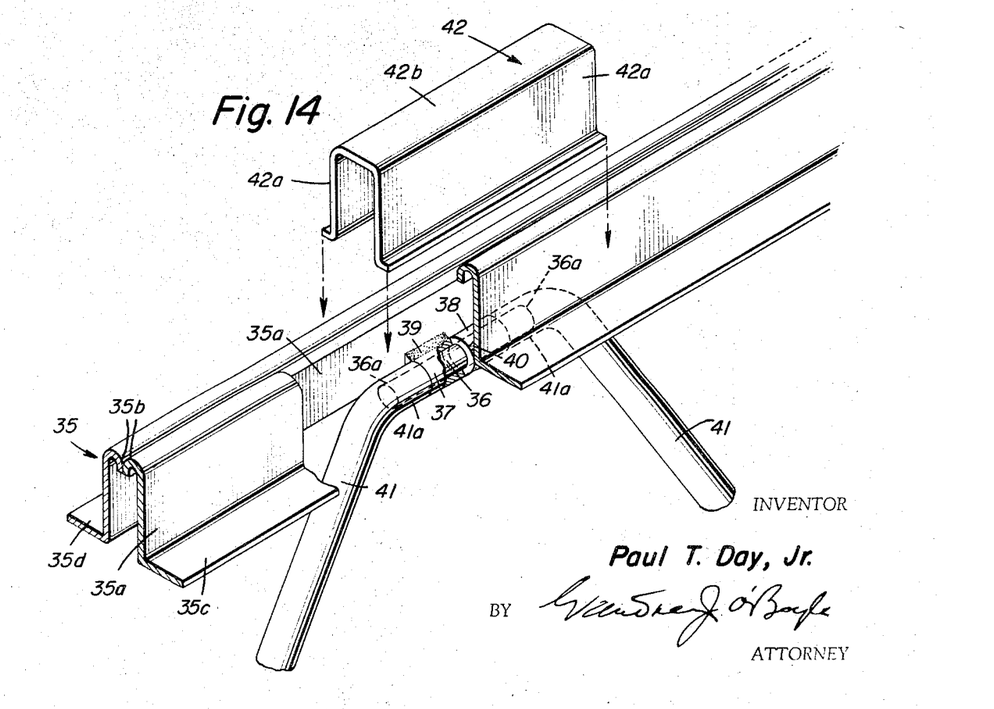
FIGURE 14 is a perspective view of a truss member, partly broken away, with the tension clip at a panel joint removed for purposes of clarity.

Referring to FIGURE 12, there is shown a series of trusses T1–T4, having panels of the character disclosed in FIGURE 11, the panels being collapsed into a compact shipping package. The panels may be continuously folded, or the deck or skin section may be double-folded into one-half the depth of the truss, the bottom or other side panel being similarly folded. In assembling the trusses of FIGURE 12, the truss T1, for example, is put into place and the panels 43 simply pivoted upwardly into aligned erected position and the tension clips 42 applied, as shown in FIGURE 11; truss T2 is then put into place and the panels unfolded, the contiguous upper and lower panels 43 and 43' of each truss being connected in the field by means of a through bolt or by welding, not shown. The remaining trusses of the package are assembled in the same fashion to complete a span of desired length. In the event that the panels of FIGURE 12 are to be continuously folded, the free ends of the inner panels may be provided with a simple piano hinge H, as shown in FIGURE 12a. The panel arrangement of FIGURE 13, which is a modification of the arrangement of FIGURE 12, is particularly adapted for relatively long spans. It will be noted that in this modification, the panels 45 are of a length substantially equal to the depth of the truss.

Figure 15:
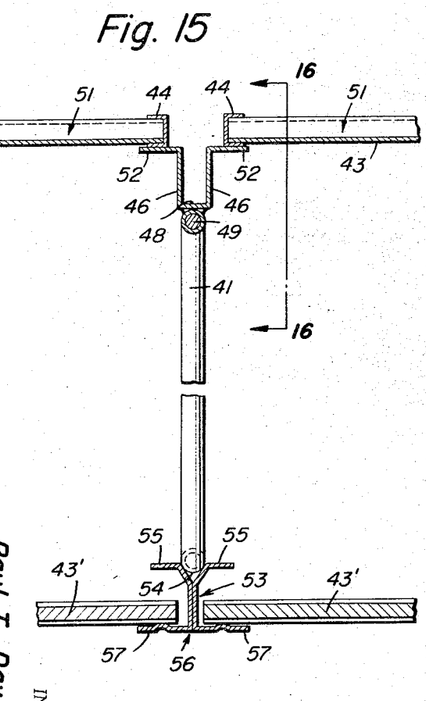
FIGURE 15 is a sectional view showing a further modification of a truss construction and associated ceiling panels.
Figure 16:
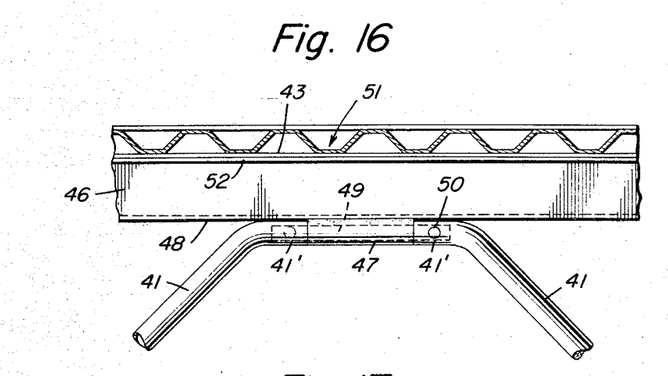
FIGURE 16 is a sectional view on line 16—16 of FIGURE 15.
Figure 17:
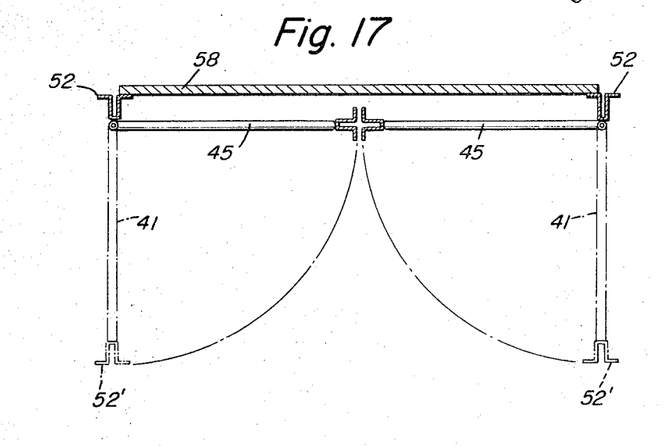
FIGURE 17 is a sectional view of a still further modification of a truss construction showing the trusses in the collapsed, folded position in solid lines, and in erected position in dotted lines.

Referring to FIGURES 15–17, further modifications of a truss construction and associated panels are shown, wherein tubular diagonals 45' are pivotally secured to the upper chord 46, FIGURES 15 and 16, by means of a tube 47 welded to the bight portion 48 of the chord, and a pin member 49 of sufficient length to extend through the tube and into the horizontal portions 41' of the diagonals to which they are spot welded, as at 50. The deck 51 of the truss may comprise corrugated metal 43, as in FIGURE 11, capped by means of channel members 44 to prevent leakage of surfacing material applied to the deck or upper skins which are secured to and supported by the wings 52 of the upper chord. The lower chord of each truss may be of generally I-section 53, the bottom portion 54 of the diagonals being secured centrally of the wings 55, the base 56 comprising oppositely disposed wings 57 upon which the suitable ceiling panels 43' formed from Celotex or the like, are supported. In FIGURE 17, the trusses 45 are shown in the collapsed folded position in solid lines, and in the erected position in dotted lines, with a ceiling panel 58 supported on the wings 52 of the upper trusses 58, the wings 52' of the lower trusses 58' being adapted to support a floor or similar panel in like fashion.

Figure 18:
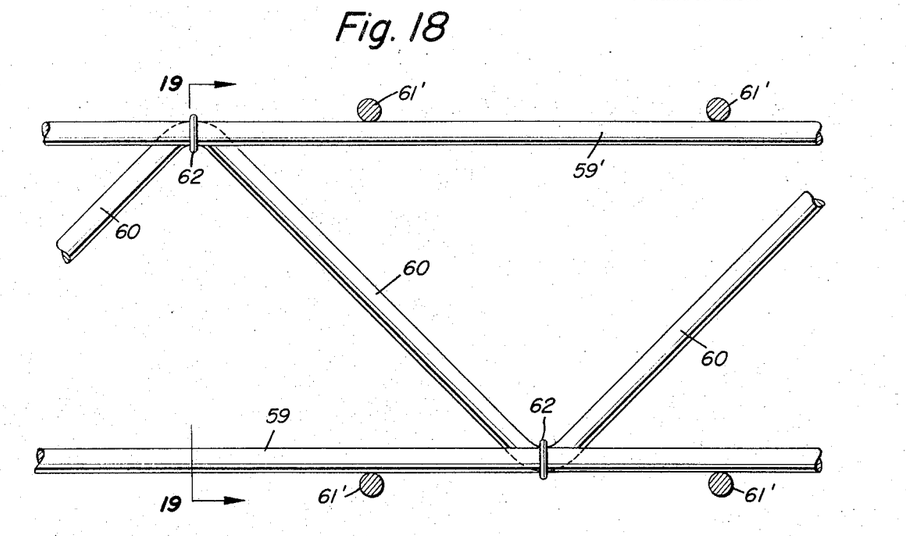
FIGURE 18 is an elevational view of a portion of a modified truss arrangement wherein the diagonal is secured to the upper and lower chords by means of clips or tie wires.
Figures 19, 20:
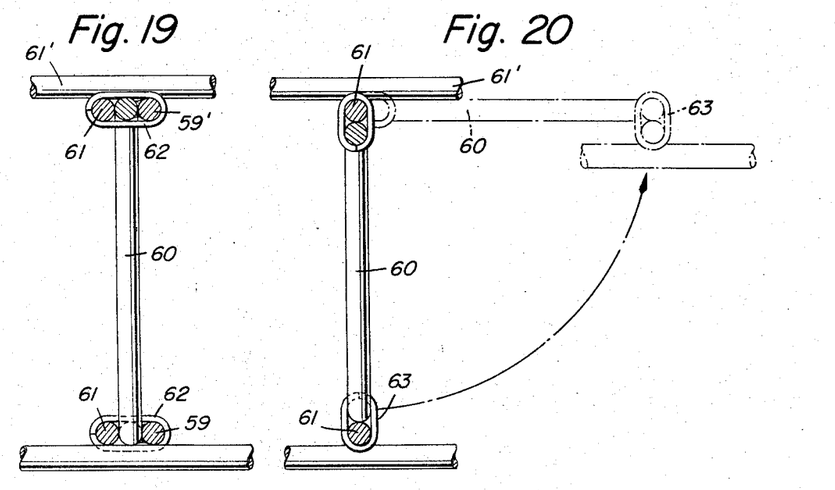
FIGURE 19 is a sectional view on line 19—19 of FIGURE 18.
FIGURE 20 is a fragmentary, sectional detail view of another modified truss arrangement, wherein the diagonal is secured to the wire mesh by means of clips or tie wires.
Figure 21:
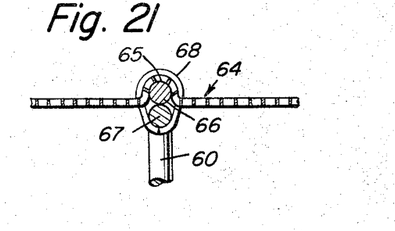
FIGURE 21 is a detail sectional view showing expanded metal or metal lath with a pre-formed channel secured to the diagonal by means of a clip or wire tie.

Referring to FIGURES 18–20, further modified truss arrangements are shown, wherein the diagonals are secured to the lower and upper chords, or to surface skin of wire mesh, expanded metal or metal lath by means of clips or tie wires. As shown in FIGURES 18 and 19, the lower and upper chords comprise metal rods 59 and 59', respectively, to which the diagonals 60 and one of the wires 61 of the wire mesh 61, 61' is secured by means of a clip member 62. It is contemplated that the truss members and the wire mesh of the arrangement of FIGURE 18 will be shipped separately, and assembled in the field or shop. The wire mesh or metal lath may be tied, clamped or welded to the chords. In the modification shown in FIGURE 20, the diagonals 60 are secured directly to the wire 61 of the wire mesh by means of a clip 63. The wire mesh in this arrangement is hinged to the diagonals, the panel being shown in the dotted line, collapsed position. The modification of FIGURE 21 comprises expanded metal or metal lath 64 having a preformed channel 65 secured to a chord 66 which is part of a preformed truss shop welded to the diagonal 67. A wire clip 68 secures the metal lath to the truss and at the same time acts as a hinge.

The improved design of the structural framework permits pipe or wiring to be conveniently run internally thereof, skins of various types may be applied to the framework, actually achieving a sandwich panel. There is no waste or debris when using the present system. Changes or alterations in dimensions may be easily and quickly made on the job by simply adding sections to the panel or removing sections therefrom.

The improved building construction system of the present invention can be erected in solid or cavity wall types, and permits selection of any desired finish by the architect. The resulting structures, particularly homes and other dwellings will be characterized by low initial and maintenance costs, and designed to offer substantially complete fire protection, and to eliminate moisture transmission and vermin infestation. In view of the relatively great strength-to-weight ratio, the structures offer advantages in typhoon and earthquake areas, not available with conventional, low-cost building construction.

While I have shown and described the preferred embodiment of my invention, I wish it to be understood that I do not confine myself to the precise details of construction herein set forth by way of illustration, as it is apparent that many changes and variations may be made therein, by those skilled in the art, without departing

What is claimed is:

1. A structural framework comprising a plurality of vertically and horizontally interconnected truss members, each of the truss members incorporating a pair of longitudinally extending ribs, each of the ribs having a longitudinal recess formed therein bounded by lateral co-planar wings carried by the ribs, a series of truss bridging members secured to the lateral wings of the ribs, a web member comprising a sheet metal channel section positioned between the ribs, and means hingedly connecting the ribs to the channel sections whereby the framework can be collapsed into a compact shipping package.

2. A structural framework in accordance with claim 1, wherein the means hingedly connecting the ribs to the channel sections comprises a pair of oppositely disposed tubular members respectively secured within the longitudinal recesses formed in the ribs, each of the channel sections having a portion of each longitudinal edge secured to a respective rod means.

3. A structural framework in accordance with claim 1, wherein the means hingedly connecting the ribs to the channel sections comprises a plurality of longitudinally spaced pairs of oppositely disposed tubular members respectively secured within the longitudinal recesses formed in the ribs, each of the channel sections having a portion of each longitudinal edge secured to a respective rod means between the spaced tubular members.

4. A prefabricated structural framework comprising a plurality of vertically and horizontally interconnected truss members, each of the truss members incorporating chords comprising longitudinally extending ribs, each of the ribs having a longitudinal recess formed therein, a series of truss bridging members secured to the ribs, a plurality of unitary diagonals positioned between the ribs, and means hingedly connecting the rib members to the diagonals, whereby the framework can be collapsed into a compact shipping package.

5. A prefabricated structural framework comprising a plurality of vertically and horizontally interconnected truss members, each of the truss members incorporating a pair of longitudinally extending ribs, each of the ribs having a longitudinal recess formed therein bounded by lateral co-planar wings, a series of truss bridging members secured to the lateral wings of the ribs, a plurality of unitary diagonals positioned between the chords, said diagonals terminating in relatively short parallel portions, and means hingedly connecting the ribs to the diagonals comprising eyelets severally secured to the respective ribs, said relatively short parallel portions of the diagonals being journaled in the eyelets, whereby the framework can be collapsed into a compact shipping package.

6. A prefabricated structural framework in accordance with claim 5, wherein each of the truss members incorporates a lower chord comprising a pair of oppositely disposed longitudinally extending angle irons, including leg members, said leg members being arranged in spaced relation to form a slot therebetween, an upper chord having a longitudinal recess therein, the unitary diagonals being positioned between the chords, and the means hingedly connecting the chords to the diagonals comprising eyelets including wing members severally secured within the slot formed in the lower chord and in the longitudinal recess formed in the upper chord, respectively, the parallel terminating portions of the diagonals being journaled in the eyelets, whereby the framework can be collapsed into a compact shipping package.

7. A structural framework comprising a plurality of pairs of vertically and horizontally interconnected truss members, one of the trust members of each pair incorporating a chord comprising a nailing strip, a plurality of diagonals positioned between the truss members, and means hingedly connecting the chords to the diagonals whereby the framework can be collapsed into a compact shipping package.

8. A structural framework in accordance with claim 7, wherein the nailing strip is formed from wood, the hinge means is secured to the nailing strip, and the diagonals are pivotally supported on the hinge means.

9. A structural framework comprising a plurality of vertically and horizontally interconnected truss members, each of the truss members incorporating a pair of chords, at least one of which comprises a pair of oppositely disposed, longitudinally extending angle irons, two of the corresponding leg portions of the angle irons having outwardly turned edges, panel members secured to the two remaining corresponding leg portions, a plurality of diagonals positioned between the chords, means hingedly connecting the angle irons to the diagonals whereby the panels may be pivoted about the hinge means to bring said panels into co-planar position and the outwardly turned edges of the leg portions of the angle irons into abutting relation, and means to maintain said outwardly turned edges in abutting relation.

10. A structural framework in accordance with claim 9, wherein the means to maintain the outwardly turned edges of the leg portions of the angle irons in abutting relation comprises a tension clip fitted over the outwardly turned edges.

11. A structural framework comprising a plurality of vertically and horizontally interconnected truss members, each of the truss members incorporating a pair of chords, each of the chords comprising a pair of oppositely disposed, longitudinally extending angle irons, two of the corresponding leg portions of the angle irons having outwardly turned edges, panel members secured to the remaining corresponding leg portions, a plurality of diagonals positioned between the chords, means hingedly connecting the angle irons to the diagonals whereby the panels may be pivoted about the hinge means to bring said panels into co-planar position and the outwardly turned edges of the leg portions of the angle irons into abutting relation, and means to maintain one pair of outwardly turned edges in abutting relation.

12. A structural framework comprising a plurality of interconnected truss members, each of the truss members incorporating chords comprising longitudinally extending ribs and an associated web member, a series of truss bridging members secured to the ribs, and means hingedly connecting the chords to the web members, said last mentioned means comprising a pair of oppositely disposed tubular members respectively secured to the chords, rod means extending through the respective tubular members, each of the web members having a portion of each longitudinal edge secured to a respective rod means whereby the framework can be collapsed into a compact shipping package.

13. A structural framework comprising a plurality of interconnected truss members, each of the truss members incorporating chords comprising longitudinally extending ribs and an associated web member, a series of truss bridging members secured to the ribs, and means hingedly connecting the chords to the web members, said last mentioned means comprising a plurality of longitudinally spaced pairs of oppositely disposed tubular members respectively secured to the chords, rod means extending through the respective tubular members, each of the web members having a portion of each longitudinal edge secured to a respective rod means between the spaced tubular members, whereby the framework can be collapsed into a compact shipping package.

14. A structural framework comprising:
    a plurality of interconnected truss members, each of the truss members including:
        a pair of spacially separated longitudinally extending chord members;

and a sinuous diagonal member intermediate said chord members, said diagonal member extending alternately between and substantially along the entire length of said chord members;

a pair of metal lath members for interconnecting each of said truss members, each of said metal lath members extending across and immediately adjacent a respective one of each of said pairs of chord members on each side of said diagonal members; and a plurality of clip members for interconnecting said metal lath members to said truss members;

each of said clip members hingedly engaging at least said metal lath member and said immediately adjacent chord member, enabling said plurality of truss members to rotate about one of said longitudinally extending chord members to position said plurality of truss members in a substantially co-planar position;

whereby the framework can be collapsed into a compact shipping package.

15. A structural framework as claimed in claim 14, wherein said sinuous diagonal member comprises a unitary member and wherein at least one of said metal lath members comprises rib lath.

References Cited

UNITED STATES PATENTS

| | | | |
|---|---|---|---|
| 878,221 | 2/1908 | Mathews | 52—356 |
| 1,043,782 | 11/1912 | Lindau | 52—646 |
| 1,141,385 | 6/1915 | Ellinger | 52—646 |
| 2,108,065 | 2/1938 | Kotrbaty | 52—285 |
| 2,314,456 | 3/1943 | Nadell | 52—646 |
| 2,987,148 | 6/1961 | Millard | 52—694 |

FOREIGN PATENTS

| | | |
|---|---|---|
| 518,598 | 4/1953 | Belgium. |
| 399,389 | 4/1909 | France. |
| 537,552 | 6/1941 | Great Britain. |
| 271,895 | 2/1930 | Italy. |
| 413,006 | 3/1946 | Italy. |

JOHN E. MURTAGH, *Primary Examiner.*

J. L. RIDGILL, *Assistant Examiner.*